(12) United States Patent
McMillan

(10) Patent No.: US 7,845,528 B2
(45) Date of Patent: Dec. 7, 2010

(54) LOAD CARRYING SYSTEM FOR MOTOR VEHICLES

(76) Inventor: Michael McMillan, 810 Coopers Ct., Caldwell, ID (US) 83605

( * ) Notice: Subject to any disclaimer, the term of this patent is extended or adjusted under 35 U.S.C. 154(b) by 970 days.

(21) Appl. No.: 11/622,353

(22) Filed: Jan. 11, 2007

(65) Prior Publication Data

US 2008/0169322 A1    Jul. 17, 2008

(51) Int. Cl.
*B60R 9/055* (2006.01)
(52) U.S. Cl. .................. 224/328; 224/310; 224/315; 224/316; 224/319; 224/324; 224/42.32
(58) Field of Classification Search .......... 224/310, 224/315, 316, 319, 321, 324, 328, 42.32, 224/42.38, 42.39, 42.4, 524, 527
See application file for complete search history.

(56) References Cited

U.S. PATENT DOCUMENTS

| | | | |
|---|---|---|---|
| 2,119,051 A | 5/1938 | Boeuf | |
| 2,784,888 A | 3/1957 | Lecanu-Deschamps | |
| D185,846 S | 8/1959 | Baxter | |
| 2,914,231 A | 11/1959 | Hornke | |
| 2,937,774 A * | 5/1960 | Roberts | 414/462 |
| 3,002,664 A | 10/1961 | Guevara | |
| 3,008,784 A * | 11/1961 | Allard | 312/198 |
| 3,061,256 A | 10/1962 | Feinstein et al. | |
| 3,215,323 A | 11/1965 | Bonitt | |
| 3,253,755 A | 5/1966 | Bott | |
| 3,531,006 A | 9/1970 | Farchmin | |
| 3,581,962 A | 6/1971 | Osborn | |
| 3,670,934 A | 6/1972 | Kraselsky | |
| 3,722,765 A | 3/1973 | Binding | |
| 3,951,320 A | 4/1976 | Bott | |
| 4,084,735 A | 4/1978 | Kappas | |
| 4,247,026 A | 1/1981 | Heifner et al. | |
| 4,317,534 A | 3/1982 | Louw | |
| 4,350,471 A | 9/1982 | Lehmann | |
| 4,362,258 A | 12/1982 | French | |
| D269,667 S | 7/1983 | Taylor et al. | |
| 4,433,804 A | 2/1984 | Bott | |
| 4,483,471 A | 11/1984 | Prosen | |
| D295,620 S | 5/1988 | Littrell | |
| D297,629 S | 9/1988 | Breger | |
| D297,630 S | 9/1988 | Breger | |
| D297,631 S | 9/1988 | Breger | |
| 4,974,766 A | 12/1990 | DiPalma et al. | |

(Continued)

FOREIGN PATENT DOCUMENTS

DE        105322        5/1898

(Continued)

*Primary Examiner*—Justin M Larson
(74) *Attorney, Agent, or Firm*—Pedersen and Company, PLLC; Ken J. Pedersen; Barbara S. Pedersen

(57) ABSTRACT

Disclosed is a load carrier made up of a flat tray like body which attaches to a vehicle by load bars. A cargo container attaches to the flat tray-like load carrier body, and is locked in one of several possible positions on the flat tray-like body. The load container may also be removed and the load carrier used without the cargo container. Devices for holding objects such as bicycles, canoes, kayaks, may also be attached to the load carrier.

23 Claims, 5 Drawing Sheets

U.S. PATENT DOCUMENTS

| | | |
|---|---|---|
| 5,181,639 A | 1/1993 | Kvanna |
| 5,236,114 A | 8/1993 | Bergquist |
| 5,560,525 A | 10/1996 | Grohmann et al. |
| 5,560,526 A * | 10/1996 | Jantzen et al. ............... 224/571 |
| 5,615,818 A | 4/1997 | Linden |
| 5,746,364 A | 5/1998 | Stengrim |
| 5,791,429 A | 8/1998 | Bergman |
| D412,881 S | 8/1999 | Behringer |
| D422,553 S | 4/2000 | VonDuyke |
| 6,056,176 A | 5/2000 | Aftanas et al. |
| 6,425,508 B1 | 7/2002 | Cole et al. |
| D462,312 S | 9/2002 | Klein |
| 6,581,813 B2 | 6/2003 | Bove et al. |
| 6,698,635 B1 | 3/2004 | Brown |
| 6,749,036 B1 | 6/2004 | Schrapp et al. |
| 6,863,199 B2 | 3/2005 | Child |
| 6,920,952 B2 | 7/2005 | Bertrand et al. |
| 7,011,173 B2 | 3/2006 | Cadotte et al. |
| 7,011,239 B2 * | 3/2006 | Williams ................... 224/310 |
| 7,025,161 B2 | 4/2006 | Bertrand et al. |
| 7,044,526 B2 | 5/2006 | Tweet et al. |
| 7,156,272 B2 | 1/2007 | Dean |
| 7,165,702 B1 | 1/2007 | Billberg |
| 2004/0134952 A1 | 7/2004 | Crepeau et al. |
| 2004/0232182 A1 | 11/2004 | Ingram |
| 2006/0163296 A1* | 7/2006 | McMillan ................... 224/319 |
| 2006/0237502 A1 | 10/2006 | Tweet et al. |
| 2006/0261111 A1* | 11/2006 | McCoy et al. ............... 224/499 |

FOREIGN PATENT DOCUMENTS

| | | |
|---|---|---|
| DE | 2621683 | 1/1977 |
| DE | 3814799 | 11/1988 |
| FR | 934495 | 5/1948 |
| FR | 2581943 | 2/1986 |
| FR | 2570336 | 3/1986 |
| JP | 08324350 A * | 12/1996 |
| WO | 8600584 | 1/1986 |
| WO | 9108929 | 6/1991 |

\* cited by examiner

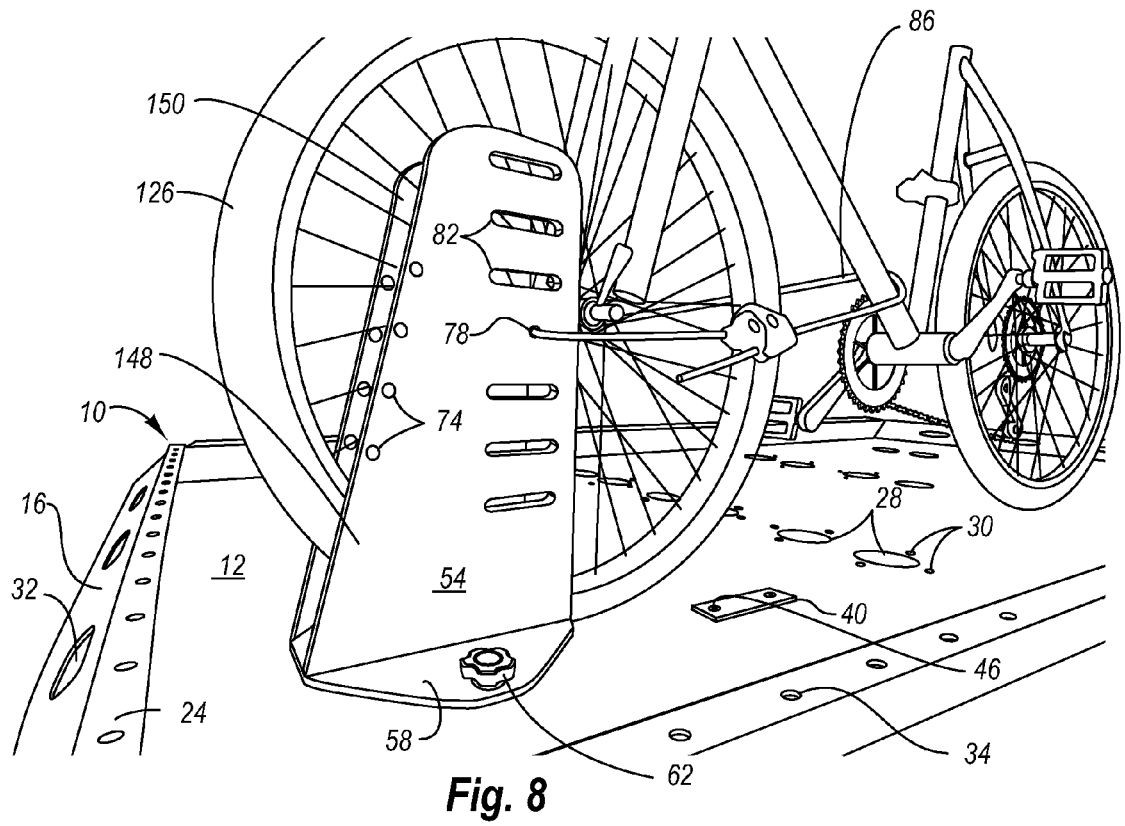
Fig. 8
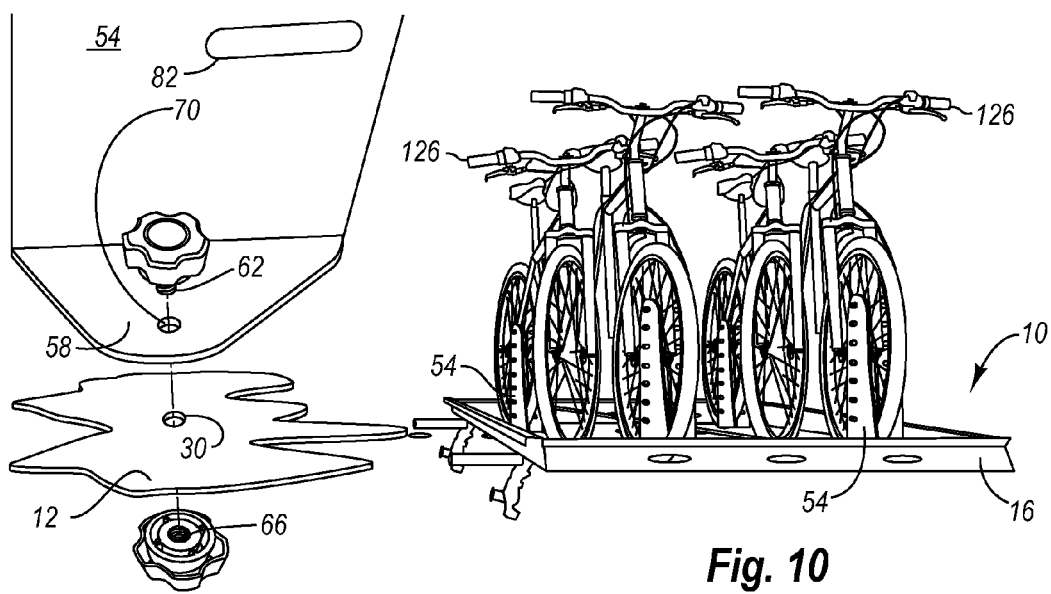
Fig. 9
Fig. 10

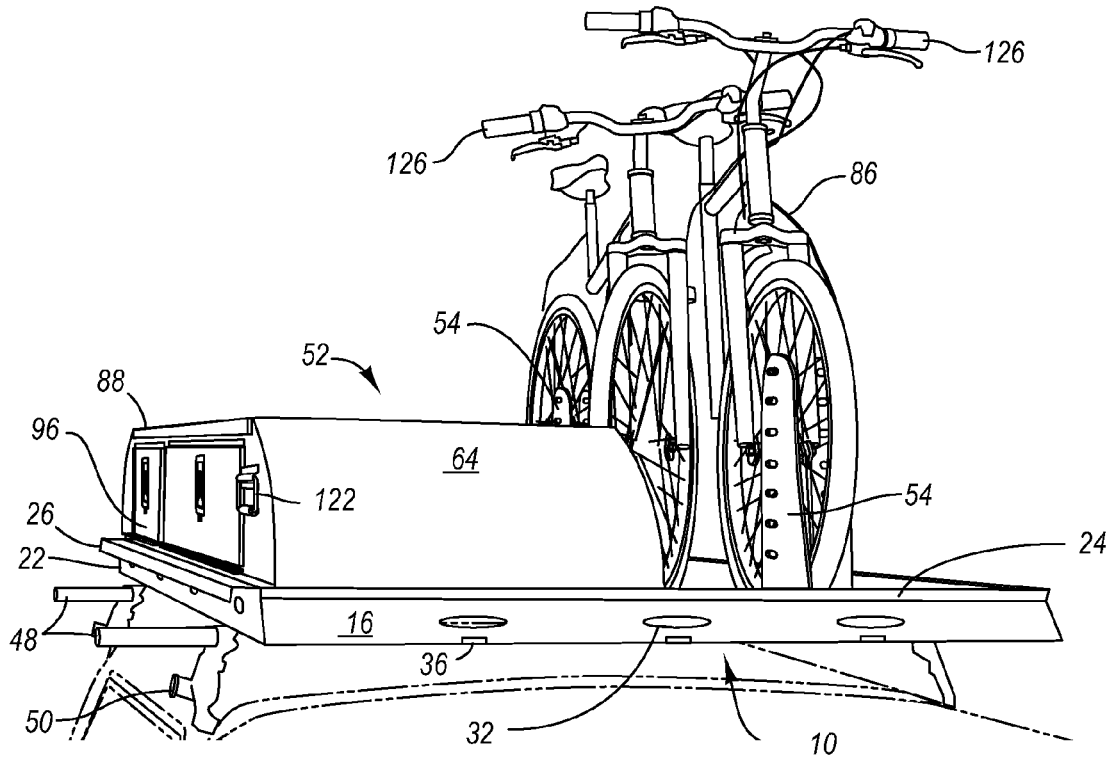
Fig. 11
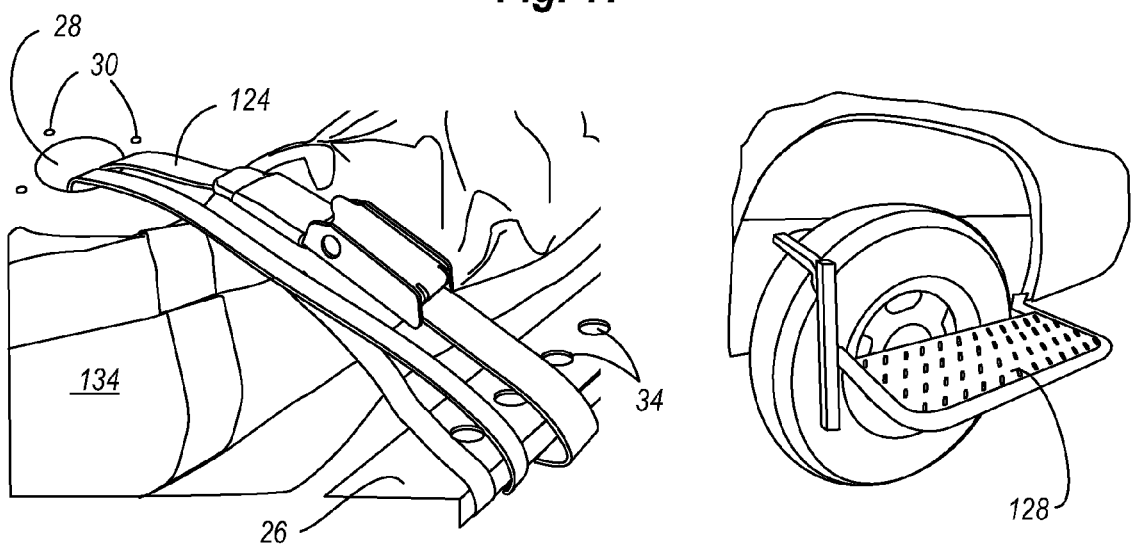
Fig. 12  Fig. 13

LOAD CARRYING SYSTEM FOR MOTOR VEHICLES

FIELD OF THE INVENTION

The present invention relates to a load carrying system mounted to the rooftop load bars of motor vehicles, and more specifically the invention is a load carrying system consisting of a four-sided pan or tray shaped load carrier body designed as a template for inter-fitting modular components, such as cargo containers and cargo posts.

BACKGROUND OF THE INVENTION

Many motorists depend upon their vehicles to support their livelihoods as well as their lifestyles, whether making the cross town commute, conducting daily business, long distance travel or pursuing weekend recreation.

When the passenger compartment and interior of a vehicle has reached its cargo carrying limit, or to routinely transport a wide variety of cargo items, many motorists turn to their vehicle's rooftop cargo carrying capabilities to meet their needs. These situations can include transport of industrial, utility or construction equipment, such as toolboxes, large tools, ladders, plumbing pipes, buckets, or when carrying bulky personal items such as luggage, furniture, boxes, bags, and recreational equipment including bicycles, skis, kayaks, canoes, surfboards, windsurfing and other odd shaped, oversized apparatus.

Odorous, wet or soiled cargo items are also commonly transported on vehicle rooftops. These items include spare vehicle tires, tire jacks, automotive accessories, fuel cans, large coolers, power tools, heavy clothing, wetsuits, fishing gear, and related sports equipment.

Over the years a number of roof rack systems and styles have been created for different cargo carrying needs. One or more load bars mounted to vehicle rooftops and camper tops enable motorists to secure various cargo items, such as ladders and lumber, directly to these load bars, suspending the cargo above the vehicle's exposed rooftop.

Some styles of load bars are factory installed, while others are custom mounted on vehicle rooftops. Load bars can vary in size, shape, load bearing capacity, rooftop placement, mounting hardware, style and design. Load bars also enable motorists to attach a variety of available cargo carrying systems and components to the load bars and their vehicles. Load bars typically span the length and/or width of a vehicle rooftop surface. Affixed to each end of a load bar is a load bar foot mounted to the vehicle rooftop using bolts, pins, rivets, clasps, hooks or other fasteners.

Heavy duty, construction, service and industrial application roof racks are generally open frame, scaffold-style beams or similar structures, mounted into pickup beds to allow overhead loading, transport, and unloading of long, heavy items such as ladders, plumbing materials, lumber and plywood.

For service industry and construction workers, toolboxes and gearboxes are often mounted in pickup beds. Trucks and vans, such as contractor, plumbing, and utility service vehicles, are commonly customized to include side-opening doors configured into locker style compartments incorporated within the vehicle. This arrangement allows the user easy access to tools, toolboxes, hardware and other equipment.

For travel and recreational enthusiasts, and those motorists seeking a variety of cargo carrying solutions, many roof rack systems depend upon cargo specific mounts or components, such as bicycle mounts, ski mounts, and watercraft mounts, attached by a bracket or clamp to the rooftop load bars of their vehicles. Cargo specific components, when mounted to a vehicle's load bars, are designed to suspend specific cargo items above a vehicle's rooftop. Motorists then load and secure and/or lock cargo items to these components directly, using customized locking mechanisms or conventional tie-down devices, such as ropes, straps, and bungee hooks.

With many cargo-carrying systems, separate mounts are designed for different cargo items such as bicycles, skis, snowboards, kayaks, canoes, surfboards, and fishing poles. Most specialized components include a combination of moving parts in their design, which can be difficult to manipulate in cold temperatures.

Another popular load carrier is the enclosed cargo container, which is also mounted directly to the rooftop load bars of vehicles. Cargo containers can be detached from vehicle load bars when not in use, or they can be left locked in place. Mounting and dismounting of these containers generally depends upon brackets and clamps mounted to the interior floor panel of the containers. This process is substantially easier when the container is first emptied of its cargo contents.

Cargo containers generally include one large top access door with a hinging mechanise on one side, however, the cargo container may comprise one or more doors on said top side for access to the interior of said cargo container. Cargo containers can be square shaped, or curved in pursuit of more aerodynamic function and stylized appearance.

Some load carriers are open structures in more or less basket style configurations. These can have wire sides or tubular or rod pieces jointed together to form a basket shaped, open top structure. The open nature of the basket design allows for transport of bulky items such as fuel cans, spare tires, boxes, furniture and bags.

Various cargo-specific components are also available, designed to attach directly to basket-style load carriers, including individual mounts for bicycles, skis, snowboards, kayaks, canoes, surfboards, and fishing poles. When cargo is secured to these mounts, cargo items are suspended above the basket, limiting available cargo space within the basket itself. Straps from gear or duffel bags, backpacks, and smaller, odd shaped items can slip through the floor and sides of basket style load carriers, potentially coming into contact with and damaging the roof of the vehicle.

Some load carriers are pan or tray shaped, with four short sidewalls and generally solid floor panels. The open configuration of a pan or tray style load carrier enables the user to carry mixed loads of bags, boxes, or other bulky items, reducing the possibility of cargo items contacting the vehicle rooftop. The user secures cargo items directly to the load carrier floor panels, rails and fixed anchor points, including eyelets and hardware that commonly protrude from the load carrier body. Securing cargo loads requires tie-down devices such as straps, ropes, cargo netting, tarps and bungee hooks.

The load carriers and cargo systems described above have certain limitations, and a different type of rooftop load carrying system would fill a need of many people. That system consists of a pan or tray shaped load carrier designed as a template for inter-fitting modular components, optimizing available vehicle rooftop cargo space and enabling the user to safely and routinely transport a wide range of cargo items.

Another object of the invention is a cargo post, which secures a bicycle upright while leaving both bicycle wheels intact. Transporting a bicycle upright protects its moving parts and paint, and transporting a bicycle while leaving both wheels intact eliminates cumbersome wheel removal and wheel reattachment by the user. The same cargo post is designed to accept skis, snowboards or other large, long items, including lumber and plumbing pipes. Items can be secured or locked to one cargo post, or multiple cargo posts used in conjunction or alignment with one another, configured and mounted within the load carrier. The cargo post can secure many types and sizes of cargo items, enabling the user to transport a variety of cargo without switching components.

Objects of the invention, such as a cargo container and a cargo post, can be configured within the load carrier body at the user's discretion, or readily removed, leaving the load carrier body empty, low profile, and ready to transport larger, bulky items such as sports equipment, fuel cans, spare tires, tools, furniture, bags and boxes.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The load carrying system of the invention is configured for attachment to the rooftop load bars of motor vehicles, including pickups, vans and SUVs. Such a vehicle would typically be one on which rooftop load bars are already attached. These can be reinforced load bars made for attachment to vehicles for carrying cargo. Load bars can also be factory mounted during the construction of the vehicle.

Load bars are generally mounted on the rooftop area above passenger compartments of vehicles. They can also be mounted to camper tops covering the truck beds of pickups, or mounted in a combination of these rooftop locations.

The load carrier body of the invention is mounted to vehicle load bars by affixing braces, brackets, clamps or u-bolts around the vehicle load bars, and attaching said braces, brackets, clamps or u-bolts to the underside of the load carrier body. Customized or conventional fasteners such as bolts and nuts can be used. A variety of customized clamps are commonly available and designed to fit around load bars of different vehicles. The load carrier body of the invention can also be attached to vehicle load bars using straps, roper, or other secure tie-down devices.

Depending upon materials used in the construction of the load carrier body, including aluminum, steel, or high impact plastic, the design and function of the load carrier of the present invention serve different load bearing capacities and cargo carrying needs of the user. The load carrier body of the invention includes four walls, from 2-12 inches in height, with the front and rear end walls positioned at supplementary angles to one another to deflect the wind, and to position cargo items in place.

The side walls are positioned upright and adjoin the load carrier's floor panel and end walls. Passages of various shapes and sizes are cut throughout the single, solid, planar floor panel, front end, rear end and side walls of the load carrier body. These passages allow for drainage, but are also designed to accept inter-fitting cargo components to engage with and be configured within the load carrier body at the user's discretion.

One component of this load carrying system is a cargo container; another component is a cargo post. Both components include rigid tabs in their designs. These tabs fit through passages cut throughout the load carrier body along its floor panel, front end, rear end, or side walls. Once protruding through a chosen passage, a tab is secured and locked into place with a padlock, pin or locking mechanism. The inter-fitting component tab, load carrier passage, and pin/padlock configuration allows the user to position the container and/or the cargo posts in multiple locations within the load carrier body.

The front lower end panel, also called the nose, of the cargo container of the invention fits securely under the load carrier front end wall, preventing forward movement of the container within the load carrier body. The rear lower end panel of the cargo container abuts against the load carrier rear end wall, also serving to position the cargo container in place. Once in position, a tab mounted on the exterior of the cargo container lower rear end panel protrudes through the load carrier rear end wall at one of several passages along the load carrier rear end wall, enabling the user to secure and lock the cargo container into place using a padlock or pin.

This removable cargo container offers a versatile, portable alternative to many cargo containers of today. The cargo container of the present invention incorporates hinged top and side doors, allowing access to the top, left and right sides of the container, depending upon which side of the load carrier, and the vehicle, the container is positioned. The container can include removable drawers and cargo space separators, and a removable tote wheel assembly for maneuvering the cargo container when it is not attached to the load carrier.

Depending upon materials used in the construction of the cargo container, including aluminum, steel, or high impact plastic, the design and function of specific cargo containers of the invention serves different load carrying capacities and cargo needs. A cargo container made of steel or aluminum can be configured to function as a removable equipment box, locking power tools and fuel cans safely within, yet still outside of, the user's vehicle.

A cargo container molded from high impact plastic that is lighter in weight is designed for recreational cargo, such as sports equipment, basic tools and automotive accessories.

The load carrier body front and rear walls are sloping at supplementary angles, to deflect the wind and to position cargo in place. The load carrier body two side walls are upright, adjoining its floor and end panels. Passages cut throughout the load carrier body function as component mounts, drainage sites and attachment sites for threading, looping or otherwise securing conventional cargo tie-down devices such as straps, ropes and bungee hooks. The design and placement of the passages throughout the load carrier body facilitate the use of accessory, load-securing components, including an inter-fitting cargo container designed to lock to the load carrier.

The cargo container of the invention includes a combination of removable and configurable cargo drawers and cargo space separators within the cargo container.

Another modular component of the present invention is a cargo post, designed to secure a variety of cargo items, rather than being cargo item specific in nature, as are many current roof rack systems.

The template of the load carrying system is a pan or tray shaped load carrier body, having a generally contiguous, flat, planar floor panel. Attached to the floor panel are an upright, solid left side wall and upright solid right side wall, a solid rear end wall, and a solid front end wall. Each wall is approximately the same height, between 2 and 12 inches. The front and rear end walls of the load carrier body are positioned at supplementary angles to one another, between 30 degrees and 150 degrees, respectively.

Each of the side walls is attached to one of the edges of the planar floor panel, and the side walls and end walls are attached to each other where their walls abut one another.

The sloping front end wall and sloping rear end wall of the load carrier body serve to secure modular components in place, such as a cargo container. This sloping design also reduces wind friction on the load carrier body.

Passages of various sizes and shapes are cut throughout the load carrier floor panel, front end wall, rear end wall, and side walls. In the preferred embodiment, passages are circular or oval in shape, to reduce pinching of cargo tie-down devices such as straps or webbing routed or looped through said passages. These passages are generally between ⅛ inch and 5 inches in diameter. These passages allow for drainage of water, ice and snow from the load carrier body.

Passages are designed to accept rigid tabs, built into inter-fitting modular components such as a cargo container. A tab is designed to fit into a passage on the load carrier body, protruding to the opposite side of the load carrier floor panel, or front end, rear end or side wall. The tab is then secured with a padlock, pin or locking mechanism.

One object of the invention is a cargo container, having four sides, a top and a bottom. The cargo container of the invention is designed to fit securely within the load carrier by abutting under the load carrier front end wall, preventing forward movement of the container, while also abutting the load carrier rear end wall, where the container is locked into place. A rigid tab on the exterior of the cargo container rear lower end panel fits into one of several passages on the load carrier rear end wall, protruding through the chosen passage. The cargo container and its tab are secured to the load carrier body using a padlock, pin or locking mechanism.

The inter-fitting designs of the cargo container rear lower end panel against the load carrier rear end wall, and the container's mounted tab within the load carrier end wall passage, and the locking mechanism of the padlock or pin, serve to inhibit lateral or upward movement of the cargo container when positioned on the load carrier body.

The cargo container rear lower tab also accepts a removable tote wheel assembly with a rigid suspension, enabling the user to more easily maneuver the cargo container when it is dismounted from the load carrier body. The tote wheel assembly attaches to the tab mounted on the container's rear end panel using a bolt or pin mechanism.

The multiple passages on the load carrier rear end wall enables the user to choose which side of their vehicle to attach the cargo container, and from which side they will access cargo items within the container. This can be the left, center, or right side of the load carrier and the vehicle. For example, in an urban area, the user can position the cargo container on the passenger (sidewalk) side of the load carrier and their vehicle, accessing cargo safely away from traffic.

Side access doors are mounted within the cargo container side walls and include a hinge, allowing the access door to suspend above a side wall of the load carrier, creating a flat workspace and cargo staging platform for the user. Side access doors of the container are held open by restraints such as chains or cables mounted to either or both interior end surfaces of a side access door. Depending upon which side hinges are located, one or more top access doors of the cargo container will open toward the left or right side of the container.

Top access doors are held open by restraints such as chains or cables mounted to either or both interior end surfaces of a top access door. Top access doors of the container are generally larger than side access doors, allowing loading and unloading of larger cargo items. Access door handles on the cargo container are recessed into the surface of the side and top access doors, and include key or combination locks.

The user configures the interior space of the cargo container to arrange removable drawers and cargo space separators, held in place by frames built within the container's interior. For example, the user can carry power tools in a separate compartment from fuel cans, or business paperwork in a separate drawer from hand tools or hardware. The user can optimize the container's cargo space by removing its drawers and separators altogether, in order to carry long or bulky items.

The cargo container can be constructed as aerodynamic and curved in design and appearance, or it can be constructed as square or box-like, depending upon the cargo carrying requirements of the user. The cargo container can include tote handles on its front end, rear end and/or side walls. Tote handles are generally recessed, designed as a one-piece mold, or they can pivot outward from the body of the container, utilizing a built-in hinge. Tote handles facilitate maneuvering of the container when it is dismounted from the load carrier body.

Another object of the invention is a cargo post, which the user secures to the load carrier floor panel. The cargo post consists of a base plate and two upright parallel towers. The towers are generally fin-shaped, accepting cargo items within the space created between the two towers. These items include a bicycle's front or rear wheel (with the bicycle frame still attached) or skis, snowboards, lumber, ladders or plumbing pipes. The bottom side of the cargo post base plate can include rigid tabs, or threaded passages drilled to accept separate pins, bolts, knobs, or a combination of these devices. The cargo post base plate is mounted flush to the top side of the load carrier floor panel, then secured or locked underneath the floor panel using a pin, bolt, knob, padlock or combination of locking mechanisms and fasteners. Once a cargo post is mounted in place on the load carrier body, the user secures or locks various cargo items to the towers and/or the load carrier body directly, using cinching and locking straps or other attachment devices.

Two or more cargo posts can be aligned if necessary to secure longer items within the load carrier body, such as lumber, plumbing pipes or ladders. Cargo items are held in place between the upright towers of the cargo post. The opposing towers can be fixed in relation to one another, or designed as adjustable in proximity to one another, enabling the user to secure different sized cargo items firmly between the towers.

The load carrying system of the invention has a number of advantages over prior rooftop load carrying systems. Mounting a cargo-specific bicycle mount directly to a vehicle's load bars limits the user to carrying only a bicycle in that particular mount. Often the removal of one of a bicycle's wheels is required to use these load bar bicycle mounts. To carry skis, a separate ski mount needs to be mounted to the vehicle's load bars. For a user to carry other cargo items on their load bars, such as snowboards, or a kayak, the purchase of separate, cargo specific components, requiring additional costs, is common.

When these mounts are not in use, but left in place on the vehicle load bars, the rooftop cargo carrying capacity of the vehicle is limited to securing alternate cargo items to the available space remaining along its load bars, again leaving the vehicle's rooftop exposed and susceptible to potential damage from cargo items during loading, unloading and transport.

Mounting a cargo container directly to a vehicle's load bars often prevents the user from simultaneously carrying bulky or awkward cargo that does not fit within the mounted cargo container, such as large luggage bags, watercraft, or bulky items such as furniture or spare vehicle tires.

When using a basket style rack, cargo must be additionally secured with conventional devices such as bags, cargo nets, tarps, straps or rope. Attaching a cargo-specific mount directly to a basket style rack can limit the cargo carrying capacity within the basket. In the case of some ski mounts for basket style racks, the rooftop mounted skis can prevent the user from carrying additional items within the basket, namely items that are taller than the sides of the basket.

In the case of some basket rack bicycle mounts, the removal of one of the bicycle's wheels is often required. The load carrying system of the present invention addresses these shortcomings. The inter-fitting design of the components within the load carrier body enables the user to optimize available rooftop cargo space, transporting a combination of cargo items of different types and sizes within a flexible rooftop cargo carrying system.

There are a number of available products well suited for use in conjunction with the present invention. All in one cinching and locking cables/straps can help prevent unintentional detachment of cargo items secured to the load carrier, when compared with conventional tie-down devices. Using adjustable tension, the user cinches and locks these cables or straps—and the cargo items—securely into place anywhere on the load carrier body.

Another available product well suited to the present invention is a removable tire step, which can be suspended over a vehicle's tires, creating a raised platform for easier loading and unloading of cargo to and from the load carrier body, cargo container, and cargo posts.

The purpose of the foregoing abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application.

The Abstract is neither intended to define the invention of the application, which is measured by the claims, nor is it intended to be limiting as to the scope of the invention in any way. Still other objects and advantages of the present invention will become readily apparent to those skilled in this art from the following detailed description wherein I have shown and described only the preferred embodiment of the invention, simply by way of illustration of the best mode contemplated by carrying out my invention.

As will be realized, the invention is capable of modification in various obvious respects, all without departing from the invention. Accordingly, the drawings and description of the preferred embodiment are to be regarded as illustrative in nature, and not restrictive in nature.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

FIG. 8 is a side view of a cargo post and a bicycle mounted to the load carrier body floor panel.

FIG. 9 is a close-up view of the cargo post base plate and mounting knobs, showing a cargo post mounting to the load carrier body floor panel.

FIG. 10 is a front view of the load carrier body, four cargo posts, and four bicycles.

FIG. 11 is a front view of the load carrier body, the cargo container, and two cargo posts securing two bicycles to the load carrier body.

FIG. 12 is a top view of a cinching, locking strap securing a duffel/ski bag.

FIG. 13 is a side view of a portable tire step mounted on a vehicle tire.

DESCRIPTION OF THE PREFERRED EMBODIMENTS

Figure 1A:
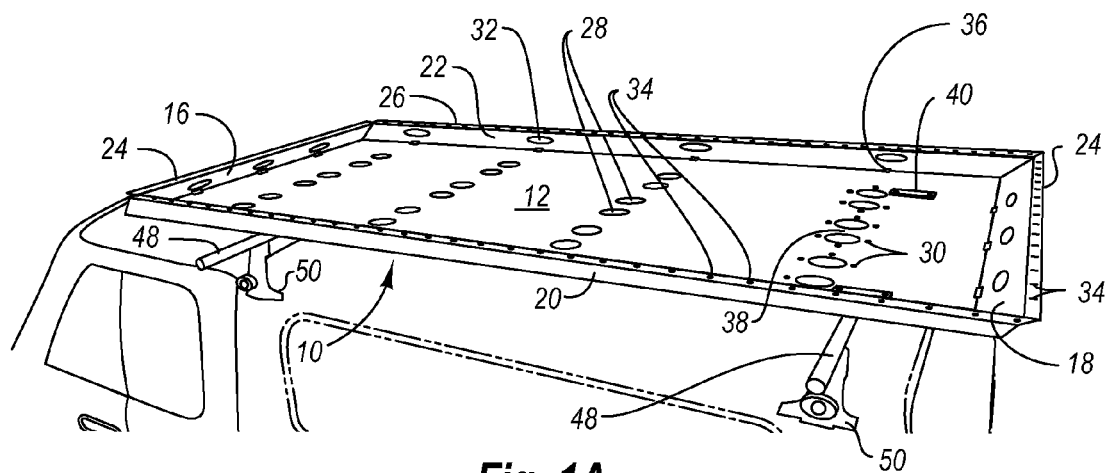
FIG. 1A is a top and side view of the load carrier body.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIG. 1A shows the preferred embodiment of one object of the invention, load carrier body 10. It can be comprised of a number of materials and a combination of materials, including metals such as aluminum or steel, and high impact plastics, depending upon the size, shapes and weight of cargo items being transported.

Load carrier body 10 can be one solid unit, as a product of plastic injection molding, or it can consist of panels or pieces welded together, as a product of metal fabrication. Load carrier body 10 includes a generally solid and contiguous planar floor panel 12, adjoining backwardly sloping front end wall 16, which is angled toward the center of load carrier body 10 at approximately 30-50 degrees. Also adjoining floor panel 12 is sloping rear end wall 18, which is angled away from the center of load carrier body 10 at approximately 130-150 degrees.

At the top of front end wall 16 and rear end wall 18 is end wall top rail 24, which is a solid beam affixed to the length of front end wall 16 and rear end wall 18. End wall top rail 24 forms a flat, top surface on front end wall 16 and rear end wall

18, and can include top rail passages 34, which are passages drilled to facilitate attachment of tie-down devices, including bungee straps and hooks.

Also adjoining floor panel 12 is left side wall 20 and right side wall 22, juxtaposed and positioned upright on load carrier body 10. Left side wall 20 and right side wall 22 can include side wall top rail 26 in their design. The flat top surface of side top rail 26 is created by bending the edge of either side wall at a right angle, away from the interior of load carrier body 10, creating a flat top rail surface between ½ to 4 inches wide. The edge of this top rail surface is again bent at a right angle, creating a narrow lip to facilitate the attachment of tie-down hooks, clasps, or other tie-down devices.

These two right angle bends in the load carrier side walls form flat top rail surface 26, which can include top rail passages 34, located at various locations along top rail 26. Top rail passages 34 are approximately ⅛ to ¾ inches in diameter, drilled through top rail surface 26 to facilitate attachment of tie-down devices such as bungee straps and hooks.

Side wall top rail 26 can be fitted with edge or rail trim 112, consisting of rubber or plastic molding reinforced with a pliable metal infrastructure. Rail trim 112 grips and covers the overhanging edge of top rail 26, creating a buffer between the top rail surface and cargo items that come into contact with it.

Cut throughout load carrier floor panel 12 are floor panel large passages 28, which are approximately 1-4 inches in diameter. Floor panel small passages 30 are placed within ½ inch to 3 inches of floor panel large passage 28, orbiting large passages 28. Floor panel small passages 30 are approximately ⅛ inch to 1 inch in diameter. Both floor panel small passages 30 and floor panel large passages 28 serve as tie-down attachment points along floor panel 12. Attachment tie-down devices including ropes or straps, or cinching and locking steel cables 86, and cinching and locking steel straps 124, can be threaded and routed between floor panel large passages 28.

The positioning of floor panel large passages 28 in pairs forms a bridge between large passages 28. These bridges are large passage anchor points 38, which are secure locations for various attachment tie-down devices including straps, cables and rope. Bungee cords with attached hooks ideally utilize both floor panel large passage 28 and floor panel small passage 30 simultaneously.

Load carrier front end wall 16 is sloping, backwardly angled toward the center of load carrier body 10 at an angle of about 30-50 degrees. Load carrier rear end wall 18 is sloping, backwardly angled away from the center of load carrier body 10 at an angle of approximately 130-150 degrees. Both front end wall 16 and rear end wall 18 are approximately the same height, about 2-12 inches. The supplementary angles of front end wall 16 and rear wall 18 serve to deflect the wind, while sloping rear end wall 18 helps facilitate loading and unloading of cargo to and from the rear end of load carrier body 10. The sloping angles of the front and rear end walls also facilitate securing cargo components, including cargo container 52, into position within load carrier body 10.

In alternative embodiments, rear end wall 18 can be constructed as upright. Rear end wall 18 can also include a hinge, or bolt and pin mechanism, along its bottom edge to allow said end wall to swing down, or be removed completely from load carrier body 10, allowing loading and unloading of cargo items directly onto floor panel 12.

Left side wall 20 and right side wall 22 are positioned upright, and are approximately 2-12 inches in height.

A series of mounting brace assemblies, including mounting brace top plate 40 and mounting brace base plate 42, is used to attach load carrier body 10 to vehicle load bar 48. (See FIG. 2.) Load bar foot 50 is an upright post that is attached to, and supports, load bar 48 on both ends of each load bar 48. A minimum of (2) load bars 48 is required for proper attachment of load carrier body 10 to a vehicle rooftop.

Figure 1B:
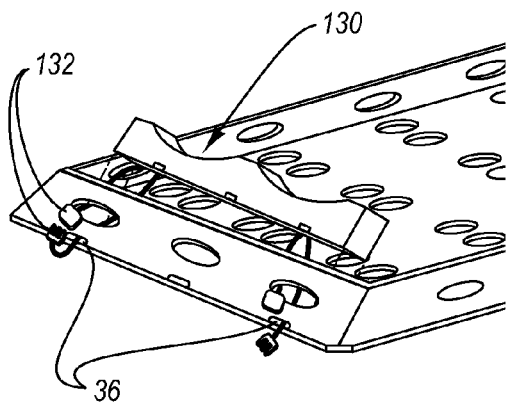
FIG. 1B is a side and front view of the load carrier body rail pad assembly.

FIG. 1B shows a front perspective of load carrier wall rail pad 130 and load carrier wall rail pad attachment straps 132 attaching to load carrier front end wall 16. The rail pad assembly (watercraft pad shown) facilitates attachment and transport of longer items placed on load carrier body 10, including surfboards, kayaks, and canoes.

Rail pad 130 and straps 132 are generally comprised of foam and nylon, serving as a buffer between load carrier body 10 and various cargo items that the user wishes to protect from scratching or other damage resulting from prolonged contact with hard surfaces.

One load carrier rail pad 130 can be attached to one or more of the walls of load carrier body 10. Affixed to rail pad 130 are rail pad straps 132, which can incorporate plastic or metal buckles, snaps, Velcro or other fasteners in their construction.

To secure rail pad 130 to load carrier body 10, the user positions the concave interior portion of the pad over the load carrier end wall top rail 24 or side wall top rail 26, then routes or loops one buckled end—the 'male' or 'female' end—of rail pad strap 132, through load carrier wall small passage 36. The end of strap 132 is then fastened to its complimentary 'male' or 'female' buckled end of rail pad strap 132. The user then cinches said strap, and pad, tightly to the load carrier wall, thus securing rail pad 130 to load carrier body 10.

Load carrier wall large passages 32 can also be utilized in the fastening of rail pad 130 to load carrier 10. Once rail pad 130 is secured to load carrier body 10, an additional attachment device, such as cinching steel cable locking strap 124, can be used to lock cargo items directly to load carrier body 10, as shown in FIG. 12.

Cinching and locking strap 124 can also be incorporated into the design of rail pad strap 132, to facilitate securing and locking of cargo items to load carrier body 10 without requiring an additional attachment or tie-down device.

Figure 2:
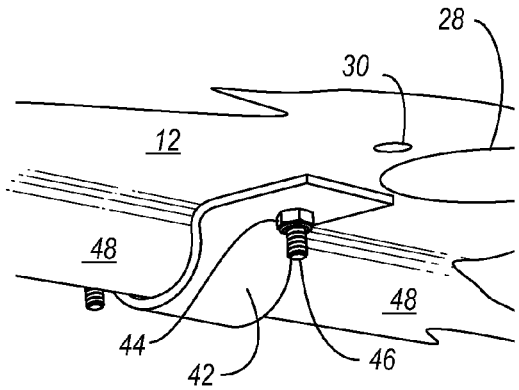
FIG. 2 is a close-up view of the load carrier body underside mounting brace assembly attaching the load carrier body to a vehicle's load bars.

FIG. 2 shows a close-up perspective of load carrier body 10 attached to a vehicle load bar 48, utilizing a mounting brace assembly. Mounting brace bolt 46 is first routed through mounting brace top plate 40, through the top side of floor panel 12, passing underneath floor panel 12 and around load bar 48, passing through mounting brace base plate 42, and finally secured with mounting brace fastener 44.

Mounting brace bolt 46 can also be routed upward from underneath floor panel 12, passing through mounting brace base plate 42, around load bar 48, through floor panel 12, through mounting brace top plate 40, and finally secured atop floor panel 12 with mounting brace fastener 44. Fastener 44 can be a nut, wing nut, butterfly nut or other fastener.

In the preferred embodiment, mounting brace top plate 40 is generally flat and recessed into floor panel 12. Mounting brace top plate 40 and mounting brace base plate 42 secure vehicle load bar 48 between them.

Mounting brace base plate 42 is generally curved to contour the shape of load bar 48, as shown in FIG. 2. In alternative embodiments, a locking mechanism can be incorporated into the mounting brace assembly, locking load carrier body 10 to load bar 48.

Figure 3:
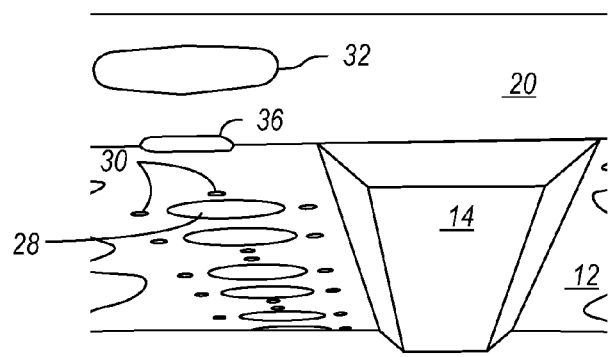
FIG. 3 is a side and bottom view of the load carrier body, including a reinforcing hat channel.

FIG. 3 shows a close-up of load carrier left side wall 20 and the exterior, or underside, of load carrier floor panel 12. Load carrier wall large passages 32 are cut into load carrier body side walls and end walls. The preferred embodiment of load carrier wall large passages 32 is oval or round in shape, to reduce pinching and friction exerted upon cargo tie-down devices, such as nylon straps or rope.

Large passages 32 are approximately 2-6 inches in length and ½ to 3 inches in width. Load carrier wall small passages 36 are generally oval or round in design. Load carrier wall small passage 36 also accepts load carrier rail pad attachment straps 132, which are affixed to load carrier rail pad 130. Wall small passages also serve as drainage sites for rainwater atop load carrier body 10.

Floor panel hat channel 14 may be affixed to the top side of floor panel 12, but in the preferred embodiment, one or more hat channels 14 is affixed to the underside of floor panel 12. Hat channels 14 are bracing beams that extend the length and/or width of floor panel 12. Each hat channel 14 is raised approximately ⅓ to 3 inches in height and about 2 to 8 inches wide. Hat channel 14 includes tapered edges where it adjoins floor panel 12.

Affixing a hat channel 14 comprised of metal to a metal floor panel 12 is done by welding or fastening with bolts, rivets or other hardware. The affixing of a high impact plastic hat channel 14 to a high impact plastic floor panel 12 is accomplished during the plastic injection molding process, when fabricating load carrier body 10 as one solid unit. Hat channel 14 can also be glued or affixed to load carrier body 10 when floor panel 12 is made of plastic, using bolts, rivets or other hardware.

Attaching one or more hat channels 14 to the top or underside of load carrier floor panel 12 increases the rigidity of floor panel 12, enabling heavier loading of cargo items within load carrier body 10, thus reducing bowing of floor panel 12, compared with a load carrier floor panel 12 that does not incorporate hat channels 14.

Figure 4:
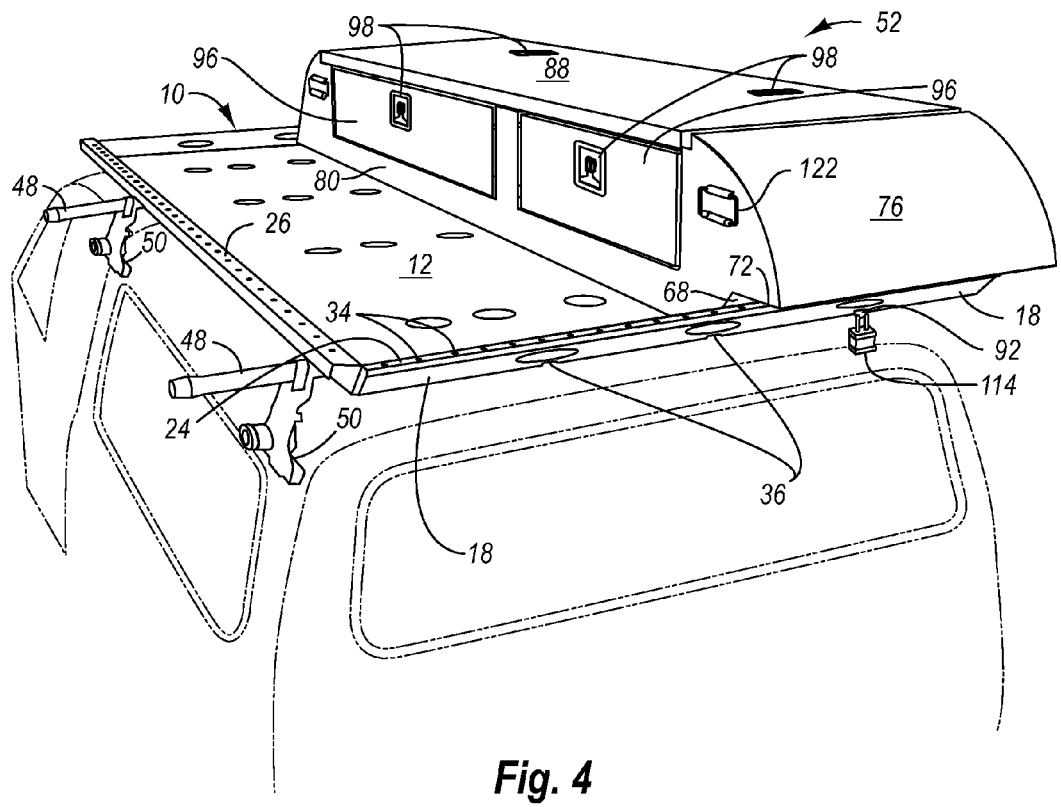
FIG. 4 is a rear view of the load carrier body and the cargo container.

FIG. 4 shows a rear and side perspective of load carrier body 10, attached to load bars 48, with cargo container 52 secured within load carrier body 10. To secure container 52 to load carrier body 10, the user slides container 52 along floor panel 12 in the center, left or right side of load carrier body 10.

Figure 5:
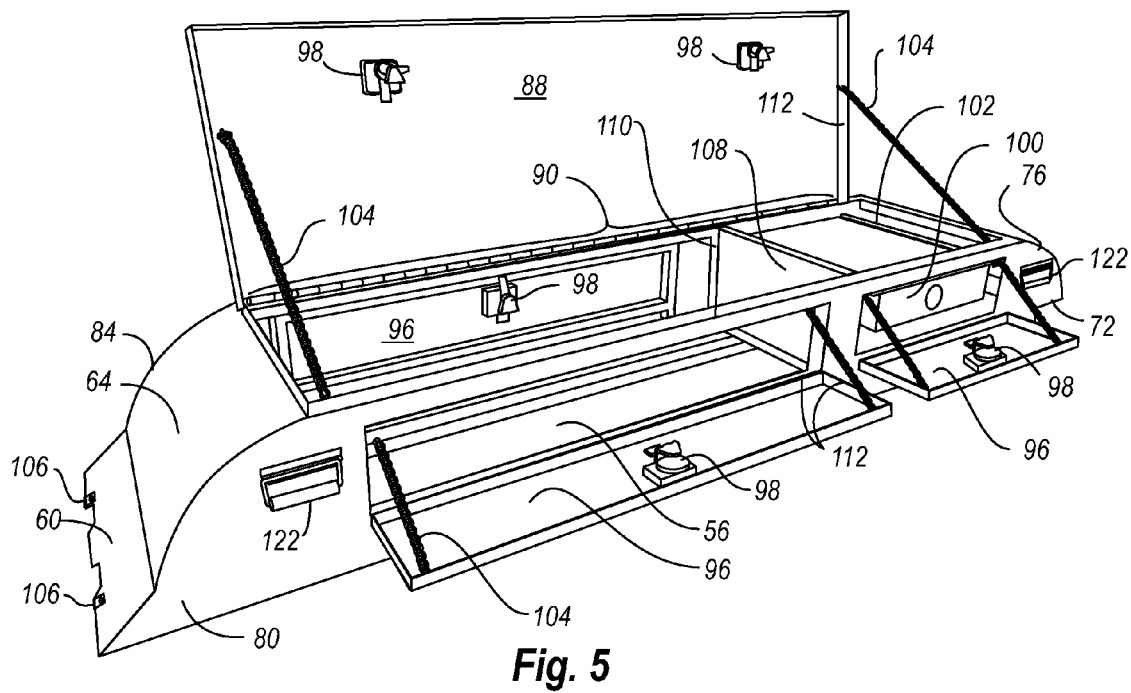
FIG. 5 is a side view of the cargo container with access doors open.

Sliding container 52 along floor panel 12 is facilitated with slide tabs 106, shown in FIG. 5. Slide tabs 106 are comprised of strips, squares or pieces of high impact plastic material, and are mounted to the exterior of container front lower panel 60 with adhesives, rivets or other fastening device. Slide tabs 106 are generally ½ to several inches wide, and attach along the bend where cargo container front lower panel 60 adjoins cargo container floor panel 56. Slide tabs 106 can also be mounted to the exterior of cargo container rear lower panel 68 and riveted, bolted, or adhered along the bend formed where container rear lower panel 60 adjoins cargo container floor panel 56.

Container front lower panel 60 fits snugly under sloping load carrier front end wall 16. This design prevents cargo container 52 from moving forward when positioned in load carrier body 10. Rear lower panel 68 of cargo container 52 incorporates the same angle as rear end wall 18 of load carrier body 10. This allows cargo container rear lower panel 68 to abut load carrier rear end wall 18. This design inhibits container 52 from moving in reverse when positioned in load carrier body 10.

To secure and lock cargo container 52 to load carrier body 10, cargo container rear lower panel tab 92 is utilized. Tab 92 is permanently mounted on the exterior of container rear lower panel 68. Tab 92 is located in the center of cargo container rear lower panel 68. Tab 92 is generally about ¼ inch to several inches in diameter. Tab 92 can be square or box-like in shape, but in the preferred embodiment shown in FIG. 4, FIG. 6 and FIG. 7, tab 92 is knob or bulb shaped.

Tab passage 94 is formed through the midsection of tab 92. Passage 94 is generally ⅛ inch to ¾ inch in diameter to allow for a variety of padlocks, pins, or other locking mechanisms.

When cargo container 52 is set into place in load carrier body 10, tab 92 protrudes through chosen load carrier wall small passage 36, located along load carrier rear wall 18. Along the base of load carrier rear wall 18, small passage 36 is modified specifically to accept tab 92. (See FIG. 6.) Once set in place through rear wall 18 at small passage 36, tab 92 is fitted with a pin or padlock 114, which is routed through tab passage 94. Once locked in place, padlock 114 (or similar pin mechanism) prevents tab 92 from withdrawing from wall small passage 36. In turn, cargo container 52 is prevented from withdrawing from load carrier body 10.

The inter-fitting relationship of tab 92, rear end wall 18, wall small port 36 and padlock 114 prevents cargo container 52 from sliding vertically or laterally along floor panel 12 and rear panel 18. The result is a secure, interlocking fit of container 52 within load carrier body 10, using one locking mechanism.

FIG. 5 shows the preferred embodiments of cargo container 52. Floor panel 56 can be flat, or it can incorporate a reinforcing channel and ridge design. One or more channels and ridges serve to increase rigidity in container floor panel 56. These channels extend the length of floor panel 56, continuing upward, into adjoining front lower panel 60 and rear lower panel 68.

The cargo container's front lower panel 60 and rear lower panel 68 also incorporate said channel design in their construction, allowing the flow of liquid, such as rainwater, beneath container 52 and out of load carrier floor panel passages 28, 30, and wall small passages 36.

Cargo container front lower panel 60 slopes at the same angle as load carrier front end wall 16, which allows container front lower panel 60 to abut underneath load carrier front wall 16. This design prevents forward movement of container 52 when it is positioned within load carrier body 10.

The container's front end can also be a one piece panel positioned upright, or curving or sloping at an angle to deflect the wind, as shown in the preferred embodiment in FIG. 5.

In FIG. 4 and FIG. 5, cargo container rear upper panel 76 is curved in a similar shape to the cargo container's front upper panel 64.

Cargo container 52 includes a left side wall 80 and a right side wall 84. Both side walls are positioned upright, adjoining the container's front lower and rear lower panels. Left side wall 80 and right side wall 84 can be solid, or they can incorporate a frame in their design to accommodate one or more side access doors 96.

One or more cargo container top access doors 88 adjoin the top of the container's two side walls. Side access doors 96 and top access door 88 can incorporate a door hinge 90 along one side.

Side and top access doors can include door suspension chains 104 affixed to their interiors, to support or suspend the access doors when in the open position, as shown in FIG. 5.

Side and top access doors include one or more locking handles 98, which are recessed into their respective access doors.

Another embodiment of container 52 is drawer 100. There can be one or more drawers 100, which slide along drawer frame 102. Drawer 100 can be accessed from either side of container 52 when either of the side access doors 96 is open. Drawer 100 can be removed to optimize bulk cargo space inside container 52.

Another embodiment of container 52 is space separator 108, held in place within space separator frame 110. Space separator 108 can be removed to optimize bulk cargo space inside container 52.

Side access doors 96 and top access door(s) 88 can include edge and rail trim 112 along interior edges to impede water from entering container 52.

Cargo container 52 includes tote handles 122 to facilitate lifting and carrying of the container, as well as facilitate the mounting and dismounting of container 52, from load carrier body 10. Tote handles 122 can include spring mechanisms to allow said handles to pivot outward when in use and return to a position flush with the container's side walls or end panels when not in use.

Tote handles 122 can also consist of recessed handholds incorporated into the side panels and end panels of container 52. In this embodiment, recessed wells or handholds would not include pivoting, spring assisted handles in their construction.

Figure 6:
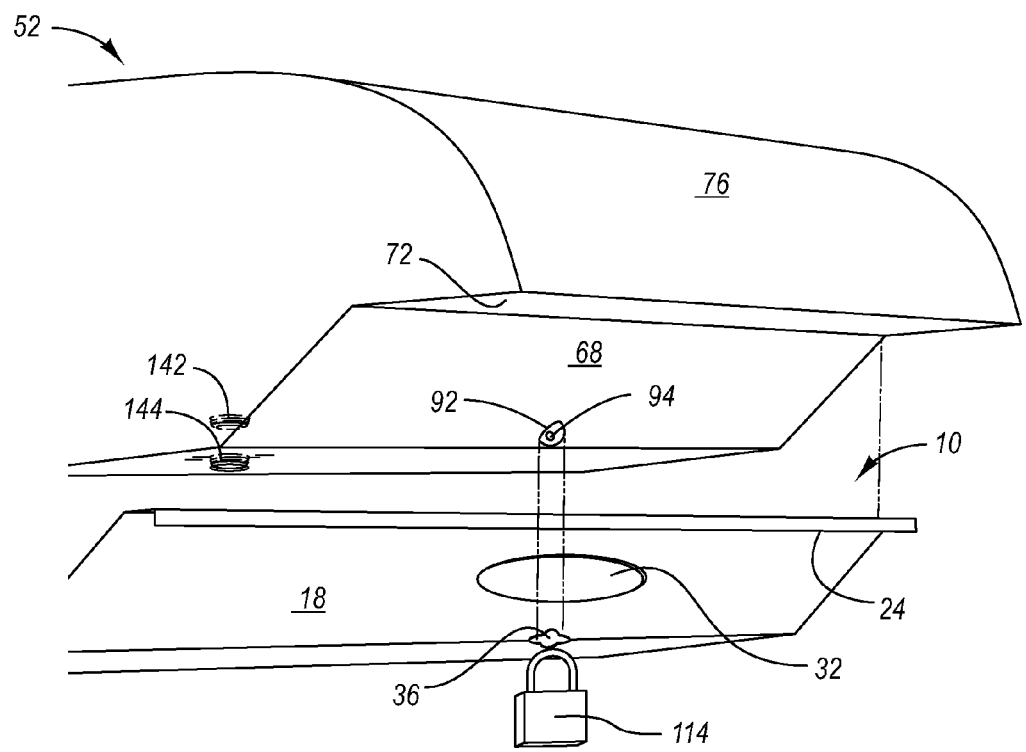
FIG. 6 is a close-up view of the cargo container lower rear panel tab, the load carrier rear end wall including a modified wall small passage, and a padlock.

FIG. 6 shows a close-up rear perspective of the mechanical relationship between cargo container 52 and load carrier body 10, and more specifically the inter-fitting and locking relationship of cargo container rear lower tab 92, permanently mounted on container rear lower panel 68, designed to fit into load carrier wall small passage 36, and be secured by padlock 114.

One embodiment of load carrier wall small passages 36 is on load carrier rear end panel 18, where wall small passages 36 can incorporate a rounded, cross, or x-shape in their design. This modification is accomplished by cutting a larger diameter passage in the center of wall small passage 36. The resulting cross or x-shape accepts cargo container lower rear panel tab 92, which protrudes through wall small passage 36 to the exterior of load carrier rear end panel 18, where tab 92 is secured by a padlock 114, pin, or other locking mechanism.

Padlock 114 is routed through tab passage 94 and locked, securing container 52 into place on load carrier body 10. The cross-shape embodiment of wall small passage 36 prevents tab 92 and adjoining cargo container rear panel 68, and thus cargo container 52, from moving vertically or laterally once it is positioned on load carrier body 10.

Alternative embodiments of a locking mechanism can be constructed and mounted directly to load carrier 10, to facilitate locking of cargo container 52 to load carrier body 10.

Cargo container front lower panel 60, also called the cargo container nose, fits securely under load carrier front end wall 16, as shown in FIG. 11, while cargo container rear lower panel 68 simultaneously abuts load carrier rear end wall 18, as shown in FIG. 6. This inter-fitting relationship of load carrier body 10 and cargo container 52 accomplishes a secure fit of container 52 within load carrier body 10, minimizing shifting of the container, vibration and noise associated with vehicle movement and wind friction.

Cargo container drainage plug receiver 144 is a threaded port mounted in cargo container floor panel 56, at the rear of container 52. Drainage plug 142 is a push-in or screw-in stopper or insert, comprised of rubber and metal. Plug 142 is designed to fit into drainage plug receiver 144, preventing liquid from entering the container from the container's underside. Plug 142 can be removed by the user when draining liquid, including water, mud or other debris, from within cargo container 52.

Figure 7:
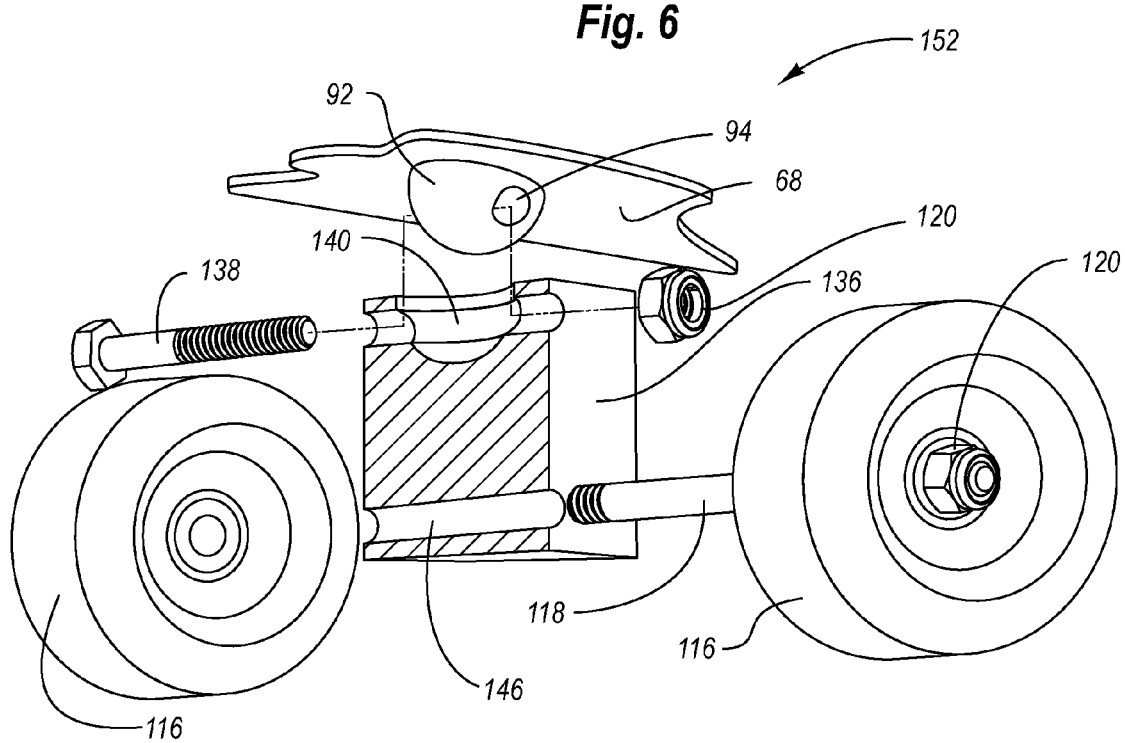
FIG. 7 is a close-up view of the cargo container rear lower panel tab and the cargo container removable tote wheel assembly.

FIG. 7 shows a close-up perspective of the mechanical relationship between cargo container rear lower panel tab 92, permanently mounted to the exterior of cargo container rear lower panel 68, and cargo container tote wheel assembly 152.

Once secured to tab 92, removable tote wheel assembly 152 enables the user to more easily maneuver and transport container 52 on the ground, when the container is dismounted from load carrier 10.

Tote wheel assembly 152 attaches to cargo container tab 92 by the following procedure: The top surface of tote wheel block 136 includes upper passage 140, incorporating a concave, molded shape complimentary to tab 92, allowing tab 92 to fit within upper passage 140. The top surface of tote wheel block 136 in turn fits flush against the flat surface of cargo container rear lower panel 68. Once in this position, the user routes tote wheel tab bolt 138 into one end of tote wheel block 136 at upper passage 140, pushing bolt 138 though tab 92 at tab passage 94. Tab bolt 138 continues through the remaining portion of tote wheel block 136 inside upper passage 140, then protrudes to the exterior of wheel block 136. The exposed, protruding end of tab bolt 138 is then secured with a fastener 120, which is a nut, wing nut or other fastener.

One or more tote wheels 116 are included in the assembly of tote wheel block 136. One tote wheel 116 is secured to one end of suspension rod 118 by a fastener 120. The opposing end of suspension rod 118 is inserted through tote wheel block 136 at tote wheel block lower passage 146. Suspension rod 118 protrudes to the exterior of tote wheel block 136, where an additional tote wheel 116 is attached to suspension rod 118 with a fastener 120.

Once secured to container 52, tote wheel assembly 152 enables the user to maneuver and transport container 52 in a manner similar to maneuvering a wheelbarrow, without an assistant. The user lifts the container's front end, holding onto cargo container tote handles 122. As the user pushes or pulls container 52 over smooth and semi-smooth ground surfaces, the tote wheel assembly 152 acts as a fulcrum, supporting the container's rear end, bearing the load of container 52, facilitating easier movement of the container 52 when compared with a container without a tote wheel assembly 152.

FIG. 8 shows a top and side perspective of load carrier body 10, utilizing one object of the invention, cargo post 54. When comprised of metal, cargo post 54 consists of several plates welded together to form one unit. When comprised of plastic, cargo post 54 can be injection molded to form one unit.

Cargo post 54 includes base plate 58, which supports two upright towers juxtaposed to one another in parallel, symmetrical formation. These two towers are cargo post left side tower 148 and cargo post right side tower 150. The space between these two towers accepts cargo items of varying widths, heights and lengths, including a bicycle wheel still mounted on a bicycle 126, or skis, ski poles, snowboards, lumber, ladders, plumbing pipes, and various cargo items.

In the preferred embodiment, cargo post 54 includes side small passages 74, middle small passages 78, and long passages 82, located along left side tower 148 and right side tower 150. These passages are of various lengths, approximately ⅛ to ½ inches in diameter. These passages serve as attachment sites for bungee hooks, straps, ropes, or other attachment devices, such as cinching locking cable 86.

In the preferred embodiment, bicycle 126 is secured and locked to cargo post 54 utilizing cinching cable lock 86. To accomplish this, one end of cable lock 86 is threaded into cargo post middle small passage 78, then threaded through the front or rear wheel of bicycle 126, then routed through the bicycle's suspension forks and/or around its frame. The cable end is finally threaded into the receiving head of cable lock 86, where the excess cable is then cinched tightly and locked into place with a key or combination mechanism. This procedure secures and locks bicycle 126 to cargo post 54, inhibiting movement or detachment of bicycle 126 from within load carrier body 10.

In alternative embodiments of cargo post 54, left side tower 148 and right side tower 150 can be positioned at various distances from one another to 'squeeze' cargo items of varied widths between the opposing towers. In these embodiments, a track system mounted on base plate 58 allows for sliding and securing of one or both towers closer to, or farther from one another, similar to that of a vise, to allow secure positioning of cargo items of various widths between the opposing towers.

FIG. 9 shows a close-up perspective of cargo post 54 mounted to floor panel 12 of load carrier body 10. Cargo post base plate 58 is aligned over the paired floor panel large passages 28 and floor panel small passages 30. Once in position, cargo post 54 is centered over any large passage anchor point 38.

A threaded bolt incorporated into mounting knob top 62 is routed through base plate 58 at base plate mounting passage 70, where said threaded bolt passes through a chosen load carrier floor panel small passage 30. The threaded bolt of mounting knob top 62 protrudes through and underneath floor panel 12, where the bolt is inserted into a receptacle in the center of mounting knob bottom 66. Once mated, mounting knob top 62 and mounting knob bottom 66 are tightened, attaching base plate 58, and in turn cargo post 54, to floor panel 12 of load carrier body 10.

In alternative embodiments, locking mechanisms can be incorporated into cargo post mounting knobs 62 and 66, serving to lock cargo post 54 to floor panel 12.

FIG. 10 shows a front and top perspective of load carrier body 10 carrying (4) cargo posts 54 and (4) bicycles 126. One cargo post 54 secures one bicycle 126 at either the front or rear wheel of bicycle 126.

In the preferred embodiment, one cinching cable lock 86 is used to secure one or more bicycles 126 at one time. The user routes or loops one end of the cable through the wheels and frames of the bicycles as they are aligned closely within load carrier body 10. One cinching cable lock 86, or one conventional locking chain or cable, may be used to secure one or more bicycles 126 to one or more cargo posts 54, or directly to load carrier body 10 in a number of locations, utilizing the passages cut throughout load carrier body 10.

FIG. 11 shows a front and side perspective of load carrier body 10, cargo container 52, (2) cargo posts 54, and (2) bicycles 126. In this arrangement, the user can open cargo container side access doors 96 to load or unload cargo items to or from cargo container 52. In the open position, side access doors 96 are suspended above right side wall top rail 26, creating a flat working surface or loading platform (as shown in FIG. 5.) The user can also access bicycle 126 without removing cargo container 52 or cargo post 54.

FIG. 12 shows a close up perspective of cinching, locking cable strap 124 securing duffel/ski bag 134 to load carrier body 10. One or more straps 124 can be used to lock a variety of items directly to load carrier body 10. The user routes or loops one end of strap 124 through a chosen passage on load carrier body 10, then threads the strap end through the locking mechanism built into strap 124. The user then cinches excess strap material tightly before binding it within the locking mechanism, in turn locking cargo items in place on load carrier body 10.

FIG. 12 illustrates how conventional cargo items such as ladders, ski bags, and various sports equipment, such as surfboards and other watercraft, can be secured to load carrier body 10 without the use of additional, customized cargo securing components.

Cinching locking strap 124 and cinching locking cable 86, shown in FIG. 8, are two products available that are well suited for use with the load carrying system of the invention.

FIG. 13 shows a close up side perspective of tire step 128, another available product well suited for use with the invention. Tire step 128 folds flat when not in use. When attached to the tire of a vehicle, tire step 128 facilitates easier loading and unloading of cargo items to and from load carrier body 10, cargo container 52, and cargo post 54. Standing upon the flat platform created by tire step 128, the user can more easily access cargo items within load carrier body 10.

The present invention provides a flexible system for carrying a variety of cargo items. Unlike prior art systems, the load carrier body of the invention incorporates passages in its design that accept configurable, versatile cargo containers that lock to the load carrier body, as well as cargo posts designed to accept a wide range of cargo items, rather than being only cargo specific in nature, as is the case with many current rooftop load carrying systems.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

What is claimed is:

1. A load carrier for attachment to a vehicle roof on which load bars are attached, comprising:

a load carrier body configured for attachment to said load bars of said vehicle, comprising a generally contiguous and planar floor panel;

a left and right side wall each having a top edge, a bottom edge, a front edge, and a rear edge;

a front end wall with a top edge, a bottom edge, and left and right edges, with said front end wall being backwardly sloping so as to form a backwardly sloping cavity located under and behind the front end wall;

a backwardly sloping rear end wall with a top edge, a bottom edge, and left and right edges;

with said bottom edge of each of said left and right side walls, said front end wall, and said rear end wall being attached to said planar floor panel, with said front edges of the left and right side walls being attached to the left and right edges, respectively, of the front end wall, and with said rear edges of the left and right side walls being attached to the left and right edges, respectively, of the rear end wall; and a cargo container configured for removable engagement with said load carrier body, said cargo container comprising parallel cargo container left and right sidewalls, a cargo container front upper panel, a cargo container front lower panel, and a cargo container rear end panel, with the cargo container front lower panel projecting from the cargo container front upper panel and being configured for fitting snugly within the cavity under the front end wall of the lad carrier body, with said cargo container rear end panel including a backwardly sloping portion configured to abut the rear end wall of the load carrier body, with said cargo container further comprising one or more access doors.

2. The load carrier of claim 1 in which said rear end wall is angled backwards from the planar floor panel at an angle of approximately 130 to 150 degrees.

3. The load carrier of claim 1 in which said cargo container is configured to be mountable either on a left, right, or center portion of said load carrier body.

4. The load carrier of claim 1 in which said one or more access doors comprise one or more side doors for access to an interior of said cargo container.

5. The load carrier of claim 1 in which said one or more access doors comprises a door on a top side, for access to an interior of said cargo container.

6. The load carrier of claim 1 in which said cargo container further comprises one or more removable vertical separators which are configured for insertion inside said cargo container.

7. The load carrier of claim 1 in which said cargo container further comprises one or more removable drawers which are configured for insertion inside said cargo container.

8. The load carrier of claim 1 which is configured for attachment to said load bars by a plurality of mounting brace attachments to said load bars.

9. The load carrier of claim 1 in which said walls are approximately 2 to 12 inches tall.

10. The load carrier of claim 1 which further comprises a plurality of attachment passages for securing objects to be carried on said load carrier planar floor panel.

11. The load carrier of claim 1 which further comprises cargo tie down passages in said side walls and end walls of said load carrier, and cargo tie down means for securing objects to said load carrier.

12. The load carrier of claim 1 which further comprises a load carrier rail pad configured for attachment to the load carrier body, for support and attachment of large items such as canoes and kayaks.

13. The load carrier of claim 1 which further includes a tote wheel and a tote wheel assembly attachable to said cargo container, for aiding in rolling transport of said cargo container when said cargo container is removed from said load carrier.

14. The load carrier of claim 1 in which said cavity under said front end wall is a wedge shaped cavity formed by the front end wall being positioned at a backward sloping angle of approximately 30-50 degrees.

15. The load carrier of claim 14 in which the front end wall and the rear end wall are backwardly sloping at angles which are supplementary angles to each other.

16. The load carrier of claim 14 in which said front lower panel of said cargo container is a wedge shaped portion of the cargo container, and is configured for interfitting engagement with said front end wall of the load carrier body.

17. The load carrier of claim 1 which includes a cargo container lockdown device for attaching the cargo container to the load carrier body.

18. The load carrier of claim 17, in which said lockdown device comprises a rear tab attached to the cargo container, which protrudes through a passage in said load carrier body for locking said cargo container in place.

19. The load carrier of claim 18 which further includes a lock on said rear tab for securing said tab in said passage in said carrier body.

20. The load carrier of claim 1, which further includes removable attachment devices for sports equipment.

21. The load carrier of claim 20 in which said removable attachment devices for sports equipment includes one or more cargo posts configured for securing a variety of load items.

22. The load carrier of claim 21 in which each cargo post of said one or more cargo posts includes a left and right tower, configured to secure between the towers selected load items.

23. A load carrier for attachment to a vehicle roof on which load bars are attached, comprising:
   a load carrier body configured for attachment to said load bars of said vehicle, comprising a generally contiguous and planar floor panel;
   a left and right side wall each having a top edge, a bottom edge, a front edge, and a rear edge;
   a front end wall with a top edge, a bottom edge, and left and right edges, with said front end wall positioned at a backward sloping angle of 30-50 degrees so as to form a backward sloping cavity located under and behind the front end wall;
   a rear end wall with a top edge, a bottom edge, and left and right edges, with said rear end wall positioned at backward sloping angle of 130-150 degrees;
   with said bottom edge of each of said left and right side walls, said front end wall, and said rear end wall being attached to said planar floor panel, with said front edges of the left and right side walls being attached to the left and right edges, respectively, of the front end wall, and with said rear edges of the left and right side walls being attached to the left and right edges, respectively, of the rear end wall;
   a cargo container configured for removable engagement with said load carrier body, said cargo container comprising parallel cargo container left and right sidewalls, a cargo container front upper panel, a cargo container front lower panel, and a cargo container rear end panel, with the cargo container front lower panel being wedge shaped and configured for fitting snugly within the cavity under the front end wall of the load carrier body, with said cargo container rear end panel including a backward sloping portion configured to abut the rear end wall of the load carrier body, with said cargo container further comprising one or more side access doors for access to an interior of said cargo container;
   a rear tab attached to the cargo container, which protrudes through a passage in said load carrier body for locking said cargo container in place; and
   a tote wheel and a tote wheel assembly attachable to said cargo container, for aiding in rolling transport of said cargo container when said cargo container is removed from said load carrier.

* * * * *